(12) United States Patent
Witt

(10) Patent No.: US 9,562,350 B1
(45) Date of Patent: Feb. 7, 2017

(54) DOUBLE FILTRATION TENSION FRAME SEDIMENT CONTROL FILTER

(71) Applicant: Carey Witt, Volente, TX (US)

(72) Inventor: Carey Witt, Volente, TX (US)

(*) Notice: Subject to any disclaimer, the term of this patent is extended or adjusted under 35 U.S.C. 154(b) by 98 days.

(21) Appl. No.: 14/519,020

(22) Filed: Oct. 20, 2014

Related U.S. Application Data

(60) Provisional application No. 61/892,441, filed on Oct. 18, 2013.

(51) Int. Cl.
| | |
|---|---|
| *E03F 1/00* | (2006.01) |
| *B01D 29/13* | (2006.01) |
| *B01D 29/00* | (2006.01) |
| *E02D 31/06* | (2006.01) |
| *E02B 3/10* | (2006.01) |
| *E02B 3/02* | (2006.01) |
| *E02B 8/02* | (2006.01) |
| *E02B 3/04* | (2006.01) |

(52) U.S. Cl.
CPC ........... *E03F 1/002* (2013.01); *B01D 29/0093* (2013.01); *B01D 29/13* (2013.01); *E02B 3/023* (2013.01); *E02B 3/04* (2013.01); *E02B 3/106* (2013.01); *E02B 8/02* (2013.01); *E02D 31/06* (2013.01); *E03F 1/00* (2013.01)

(58) Field of Classification Search
CPC ........... E02B 3/023; E02B 3/04; E02B 3/106; E02B 3/108; E02B 3/12; E02B 3/122; E02B 3/127; E02B 8/02; E02D 31/06; E03F 1/00; B01D 29/0036; B01D 29/13; B01D 2221/12

USPC ................ 210/747.3, 162, 170.03, 486, 495; 405/16, 17, 19, 36, 302.6, 302.7

See application file for complete search history.

(56) References Cited

U.S. PATENT DOCUMENTS

| | | | | |
|---|---|---|---|---|
| 6,875,350 B2* | 4/2005 | Allard | ............ | B01D 29/27 210/170.03 |
| 7,357,861 B2* | 4/2008 | Kelley | ............ | E03F 1/00 210/162 |
| 7,544,016 B2* | 6/2009 | McGinn | ............ | E02B 3/04 210/170.03 |
| 7,811,028 B1* | 10/2010 | de la Rosa | ............ | E02B 3/04 405/302.6 |
| 7,922,916 B1* | 4/2011 | Witt | ............ | E03F 1/00 210/162 |
| 2002/0131827 A1* | 9/2002 | Spangler | ............ | E02B 3/04 405/302.6 |
| 2004/0247399 A1* | 12/2004 | Kimberlin | ............ | E02D 17/202 405/302.6 |
| 2008/0131212 A1* | 6/2008 | Quinley | ............ | E02B 8/02 405/302.6 |

(Continued)

*Primary Examiner* — Christopher Upton

(57) ABSTRACT

A double filtration sediment control device to improve sediment removal from stormwater. A sheet of filtering geotextile is sewn to form a sleeve and a leading flap. An elongated flat, flexible frame is bent longitudinally to form an arch that is inserted into the geotextile sleeve. After insertion, the frame expands against the sleeve to support the sleeve in an arched orientation with an uphill leg and a downhill leg. The outside of the uphill leg is a first filtering surface, and the inside of the downhill leg is a second filtering surface. The flap is covered with soil to direct water through the device, and the device is anchored with sod staples driven through the flap. The frame provides a height and functional rigidity to the assembly. The second filtering surface may be a finer filter than the first filtering surface.

20 Claims, 9 Drawing Sheets

(56) References Cited

U.S. PATENT DOCUMENTS

2009/0022552 A1\* 1/2009 Berenyi .................. E01F 7/025
                                                    405/302.6
2009/0266767 A1\* 10/2009 McInnis .................. E02B 3/108
                                                    210/170.03

\* cited by examiner

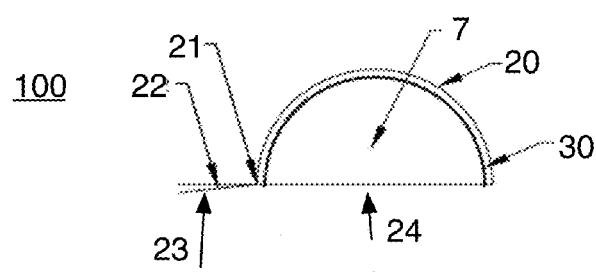
FIG. 1
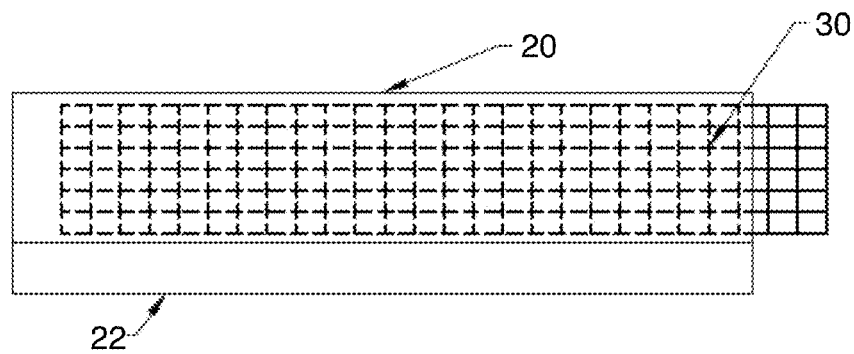
FIG. 2
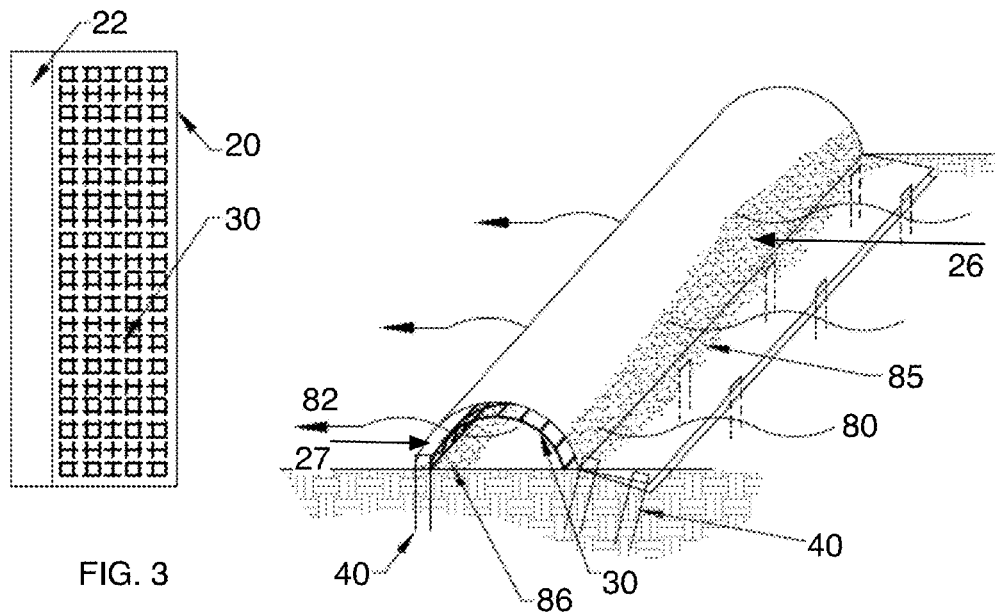
FIG. 3
FIG. 4

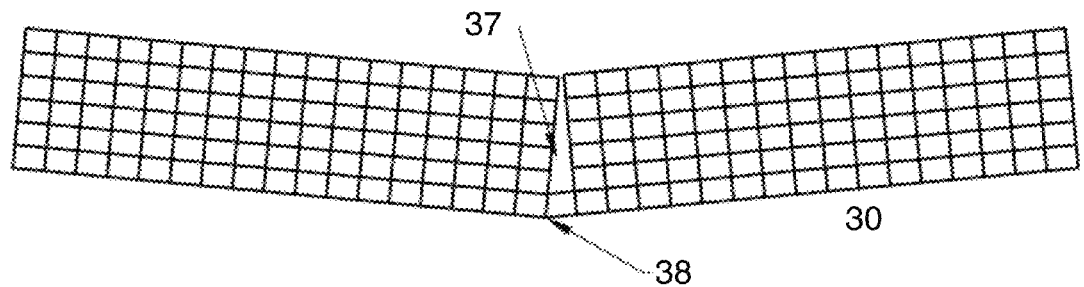
FIG. 21
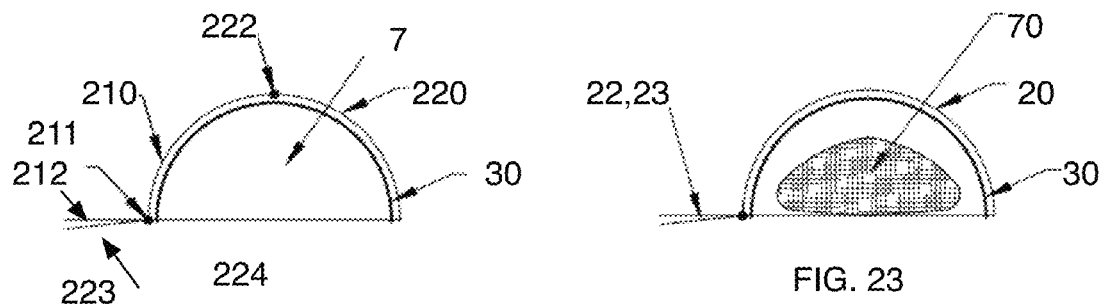
FIG. 22
FIG. 23
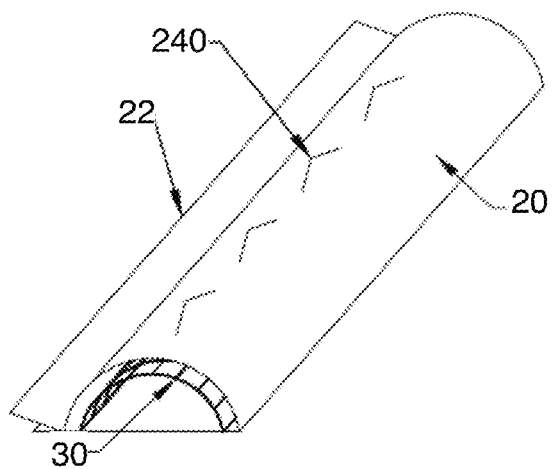
FIG. 24

DOUBLE FILTRATION TENSION FRAME SEDIMENT CONTROL FILTER

This US non-provisional patent application is related to U.S. Provisional Patent Application No. 61/892,441 filed Oct. 18, 2013 by applicant, and claims the priority of that filing date.

BACKGROUND

Field of the Invention

A sediment control device is used to intercept sediment-laden stormwater runoff and to remove the sediment that would otherwise pollute downslope areas and waterways. More particularly, the device includes a frame and a filtering fabric with two filtering surfaces.

Prior Art

Sediment laden stormwater runoff from construction sites is a major contributor to pollution of waterways and receiving bodies of water. The common practice is to treat stormwater runoff from construction sites by installing silt fences around the perimeter of the site and along downstream portions of the site to retain the sediment on-site. Silt fences are often ineffective at controlling sediment loss from sites due to a number of factors including: improper design, improper installation and maintenance or the ineffectiveness of the silt fence device itself. In many cases, the silt fence fabric does not allow proper filtration or becomes clogged and rather than filter stormwater, the stormwater is ponded behind the silt fence causing disruption of the drainage patterns which can lead to further soil erosion, transport of sediment and increased downstream pollution. Another shortcoming of current devices is that they must be removed and replaced during various phases of construction to allow for construction access, leaving the construction sites unprotected.

A typical silt fence consists of a synthetic filter fabric (geotextile) stretched between wooden or metal fence stakes along horizontal control level. The stakes are installed on the downhill side of the fence and the bottom edge of the fabric is trench into the soil and backfilled on the uphill side. The stormwater slowly passes through the fence while depositing the sediment on the uphill side of the fence. Stronger silt fences are created by reinforcing the filter fabric with a wire mesh backing Another product that is utilized is a sediment filter sock or tube. These devices consist of a tube or sock of permeable netting with an inner core of synthetic or organic filter material. These devices are typically placed In a slight depression that is formed in the ground and secured with wood or metal stakes that are driven through the tubes or are driven behind the tubes and connected to the tubes with wire, ropes or similar devices. Much like typical silt fences these filter socks or tubes can be ineffective due to typical poor flow-through characteristics and difficulties associated with ineffective installations.

SUMMARY OF THE INVENTION

A low profile double filtration sediment control device is used to improve sediment removal from stormwater. In one embodiment, a sheet of filtering geotextile is folded and seamed to form a sleeve and a leading flap. An elongated flat, flexible self-supporting frame is bent longitudinally to form an arch that is inserted into the geotextile sleeve. After insertion, the frame expands against the sleeve to support the sleeve in an arched orientation with an uphill sleeve leg and a downhill sleeve leg. The combination of a flexible frame and a containment sleeve permits a flat frame to be bent into an arched shape, and kept at moderate compression to create a self-supporting rigidity so that deep posts are not required for structural rigidity. The self-supporting structure tends to direct most stormwater forces to the ground, so that short ground staples are all that is necessary to keep the device from slipping.

The outside of the uphill sleeve leg is a first leading filtering surface, and the inside of the downhill sleeve leg is a second trailing filtering surface. The double filtering surfaces permits the device filtering fabric(s) to be configured for greater stormwater flow, improved filtering, or both. The flap is covered with soil to direct water through the device, and the device is anchored with sod staples driven through the flap. The frame provides a height and functional rigidity to the assembly. The second filtering surface may be a finer filter than the first filtering surface.

In one example, a planar polymeric permeable frame is provided and that frame is bent longitudually to form an arch that is inserted into the geotextile sleeve. In other examples, a bent metallic frame or extruded three dimensional polymer frame may be slightly compressed longitudinally and inserted into the sleeve.

In one embodiment, the flexible frame is a flat sheet of polypropylene geogrid or similar geosynthetic, that is bent along the longitudinal axis and inserted into the geotextile filter sleeve that is pre-sewn to the proper size to receive the frame. In another embodiment, the frame is an injection molded frame that is formed into the "C" shape. The frame is inserted into the pre-sewn geotextile filter sleeve.

In another embodiment, the geotextile sleeve is comprised of two separate geotextiles and is sewn together such that the fabric along the front of the device has higher flow-through characteristics and less filtration capabilities then the geotextile along the back of the device. In this form the device will double filter stormwater by retaining larger particles against the front geotextile and finer particles against the back geotextile. Additionally, as the stormwater ponds inside the device, sediment will fall out of suspension, thereby furthering sediment removal.

In another embodiment, the sediment filtration capability of the device would be enhanced by inserting flocculant tablets or granules into the air space of the device as it is being installed. The flocculant agent would dissolve into the stormwater being filtered through the device and the flocculation process would cause suspended sediment particles to bind and fall out of suspension thus enhancing filtration.

In another embodiment, the filtering sleeve is an open woven geotextile. In addition to the filtering provided by the geotextile, a sediment capture roll or tube is inserted into the center of the device to provide additional filtration and a higher degree of pollutant removal. In one embodiment, the device is assembled from a kit comprising a plurality of frame sections, sleeves, and sod staples. Segments are assembled in the field and interconnected to a desired length.

In another embodiment, the sleeve is formed from materials with different filtering capacities so that a higher capacity filter surface is provided on the uphill sleeve leg, and a lower capacity filter surface is provided on the downhill sleeve leg.

In another embodiment, the sleeve is formed from two sheets of geotextile filter, and both an uphill flap and downhill flap are provided to facilitate installation and water flow.

In another embodiment, a bent metal or extruded frame is provided. The bent metal or extruded frame has sufficient flexibility to permit a slight compression of its arch in order to insert the frame into a sleeve.

In another embodiment, the seam is formed after a geotextile is wrapped over a frame.

In another embodiment, a foam connector piece is provided to connect frame segments.

BRIEF DESCRIPTION OF THE DRAWINGS

FIG. 1 is a cross-section of first embodiment of a double filtration sediment control filter with a geotextile filter sleeve, a leading double flap, and a tension frame.

FIG. 2 is a top cross-section of the sediment control filter of FIG. 1 with the frame partially inserted into the sleeve.

FIG. 3 is a top cross-section of the sediment control filter of FIG. 1 with the frame inserted into the sleeve.

FIG. 4 is a perspective view of an installed sediment control filter of FIG. 1 showing stormwater flow paths through the filter.

FIG. 21 is a side view of frame segments showing removal of a central wedge to allow the frame to articulate to accommodate variable sloped terrain.

FIG. 22 is a cross-section of the double filtration sediment control filter with a dual geotextile filters.

FIG. 23 is a cross-section of a sediment control filter with an additional sediment capture tube or roll inserted into the central core of the sleeve.

FIG. 24 is a perspective view of a filter with high flow relief cuts.

DETAILED DESCRIPTION

Figure 5:
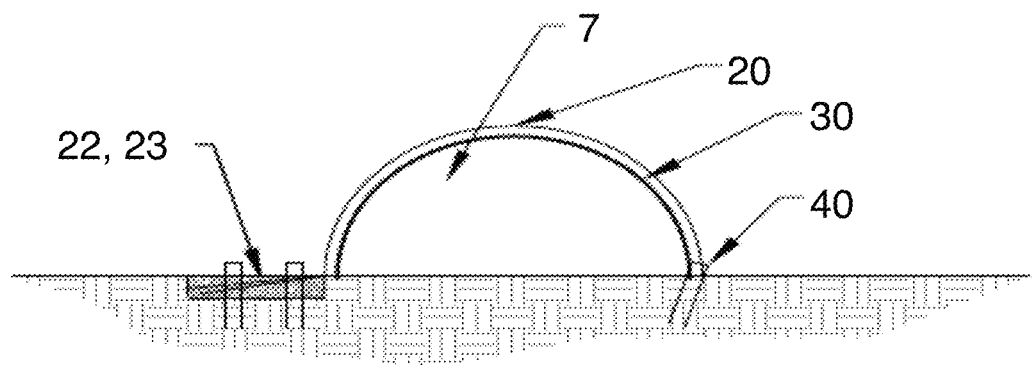
FIG. 5 is a cross-section of the installed sediment control filter of FIG. 1 with sod staples installed through a double front flap.

FIGS. 1-14 show a first embodiment of a double filtration sediment control filter formed by bending a flexible frame and inserting it into a geotextile filter sleeve.

FIG. 1 is a cross-section of a double filtration sediment control filter 100 showing a geotextile filter sleeve 20 formed by folding a sheet of geotextile and forming a seam 21 with two flap segments 22 and 23 extending beyond the seam 21. An inner flexible permeable tension frame 30 has been inserted into the filter sleeve 20. An air space 7 is created between the frame 30 and a bottom section 24 of the filter sleeve In one example, the filtering geotextile is sewn, adhered, stapled, or otherwise attached to itself to form a tube or sleeve and a seam 21. Two extension portions 22 and 23 of the geotextile extend beyond the tube or sleeve seam to form a double geotextile leading flap or flange that extends horizontally upslope of the device. The flap is used to anchor the device to the ground. The flap is typically covered with a thin veneer of soil or are placed into an anchor trench on the leading edge of the device.

FIG. 2 is a cross-section of the double filtration sediment control filter with the inner permeable support frame 30 partially inserted into the geotextile sleeve 20. FIG. 3 is a cross-section of the double filtration sediment control filter with the inner permeable support frame 30 fully inserted into the geotextile sleeve 20.

FIG. 3 is a top view of the double filtration sediment control filter. The inner frame 30 is inserted into the outer geotextile sleeve 20.

The device is anchored to the ground with wire sod staples along the front and back of the device. Front anchoring may be provided through the leading flaps, and rear anchoring may be provided through the fabric and frame. In other examples, a trailing flap may be provided to provide a surface for rear anchoring. The device provides double filtration as the stormwater passes through both planes of filter fabric thus providing improved filtration. A first leading filtration surface is provided on the outside of the uphill-facing portion of the geotextile. A second trailing filtration surface is provided on the uphill-facing inside portion of the geotextile.

FIG. 4 is a perspective view of the double filtration sediment control filter showing a typical installation as a perimeter sediment control filter. Sediment-laden stormwater 80 enters the device through the first filter layer 26 of the geotextile filter, travels through the inner core and the associated air space 7 and exits through the secondary geotextile filter layer 27. Sediment 85 is collected at the first layer 26, and sediment 86 is collected at the second layer 27. The filtered water exits as stream 82.

FIG. 5 is a cross-section of the double filtration sediment control filter showing typical anchorage of the front geotextile flaps 22 and 23. In this example, sod staples are inserted through both flaps.

Figure 6:
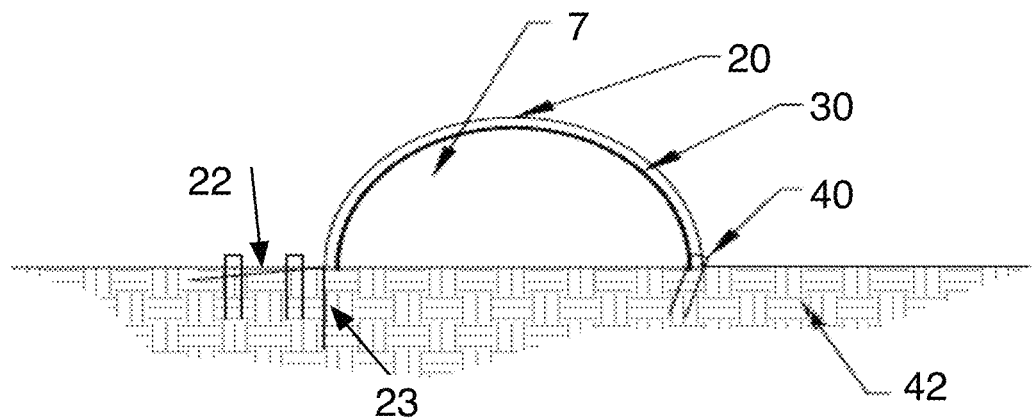
FIG. 6 is a cross-section of the installed sediment control filter of FIG. 1 with sod staples installed through a single horizontal front flap, and a buried vertical flap.

FIG. 6 is a cross-section of the double filtration sediment control filter showing an alternate means of anchoring filter. In this example, the first geotextile flap 22 is oriented horizontally and is secured by staples. The second flap 23 is buried in a vertical orientation in an anchor trench in ground 42.

Figure 7:
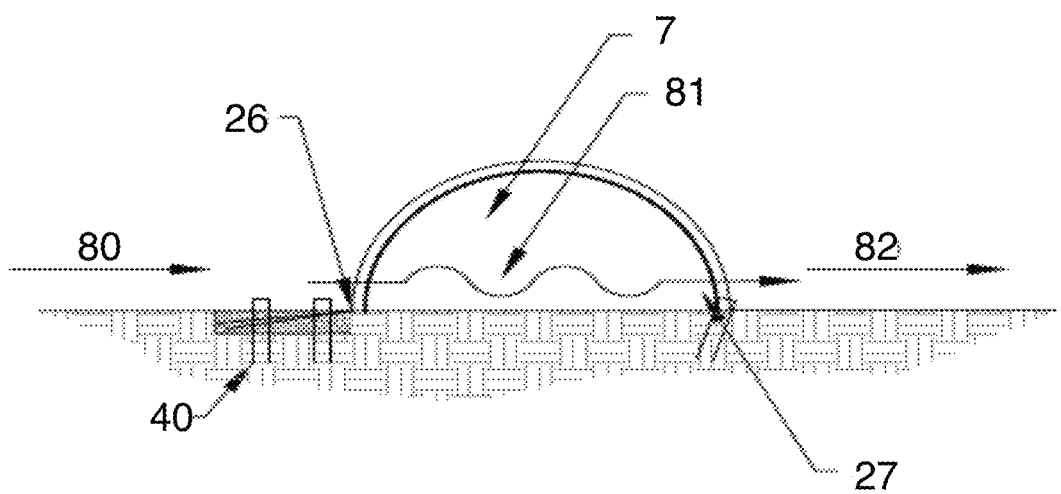
FIG. 7 is a cross-section of the installed sediment control filter of FIG. 5 showing a first filter zone and a second filter zone.

FIG. 7 is a schematic cross-section of the double filtration sediment control filter showing storm water flow 80 through first filter layer 26. The exit stream 81 is filtered through a second filter layer 27 before exiting as stream 82.

Assembly

In one example, onsite assembly of the device comprises bending the flexible frame along the longitudinal axis and inserting the bent curved frame into the geotextile sleeve, orienting the frame, such that, as it expands, is oriented to create a flat bottom that is in-line with the geotextile flaps. The frame is manufactured of a plastic that has good elastic properties, such that, as it expands into the sleeve, to return to the flat configuration, it creates tension in the geotextile keeping the geotextile taught and creates the inverted C-shape of the device.

Figure 8:
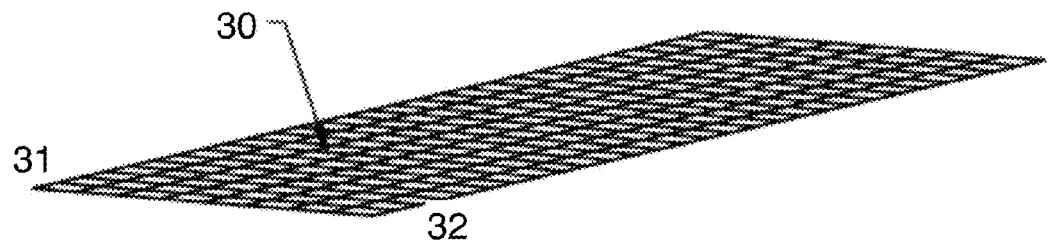
FIG. 8 is a perspective view of the frame of FIG. 1 in the flat configuration.
Figure 9:
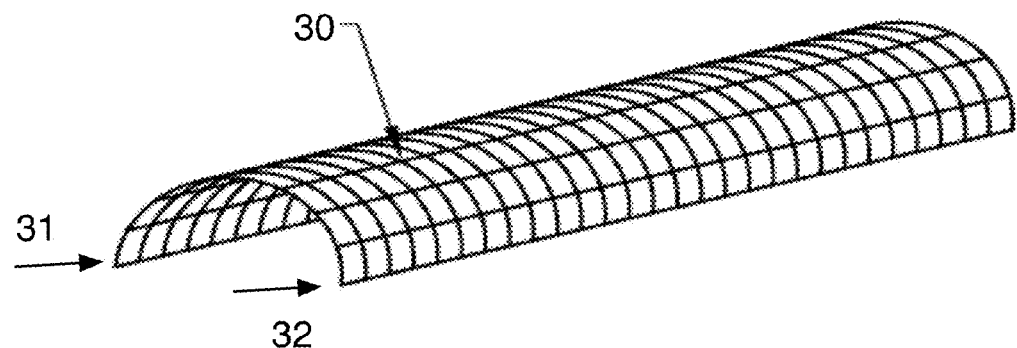
FIG. 9 is a perspective view of the frame of FIG. 1 bent or formed to a "C" shape.
Figure 10:
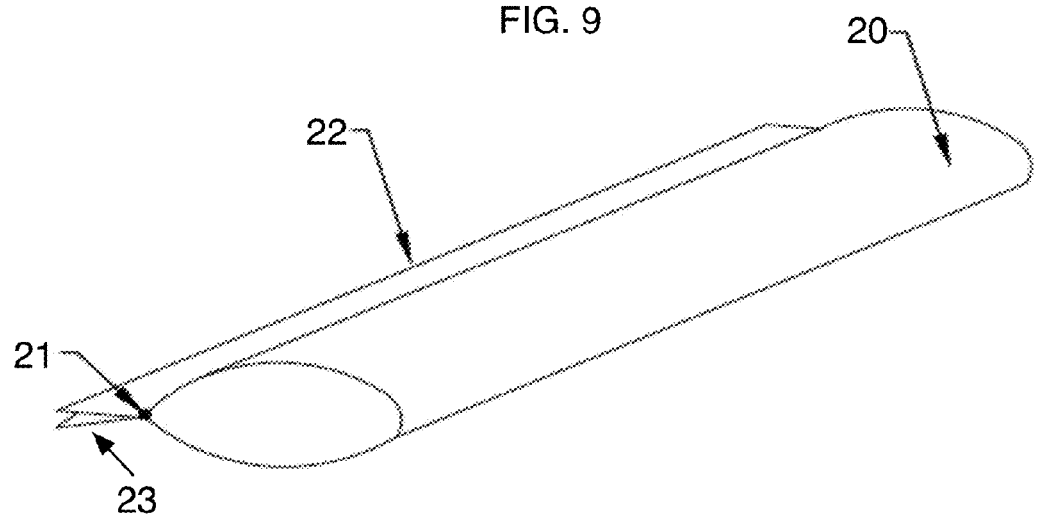
FIG. 10 is a perspective view of the sleeve of FIG. 1
Figures 11, 12:
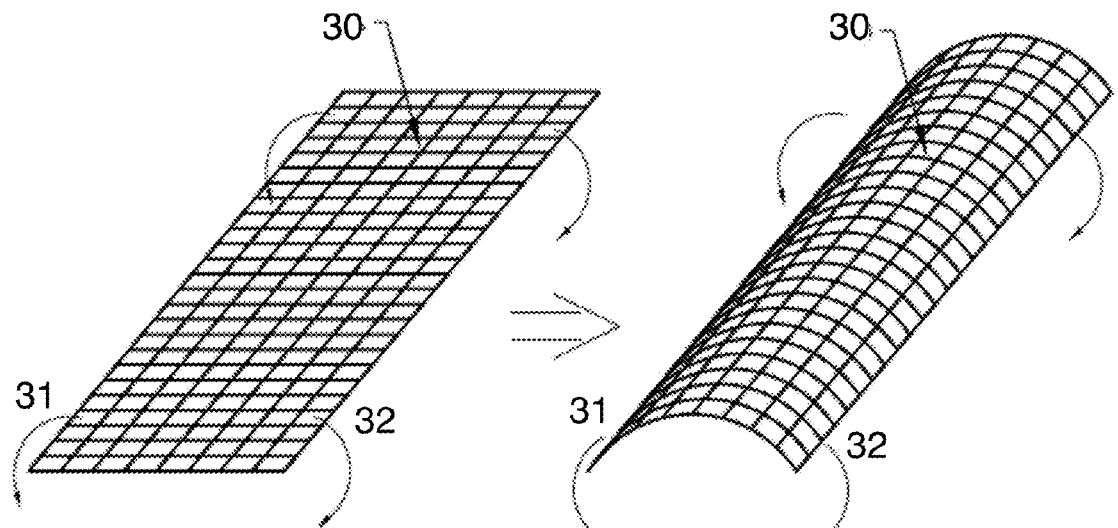
FIGS. 11-14 are perspective views showing bending of a flat frame of FIG. 8 to an arched shape for insertion into a sleeve.
Figures 13, 14:
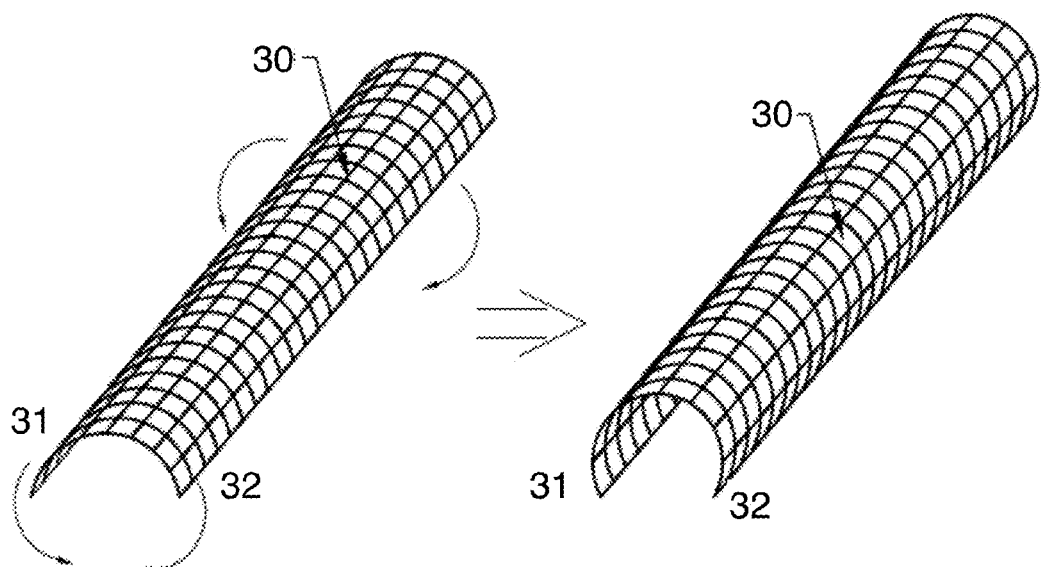
Figures 15, 16:
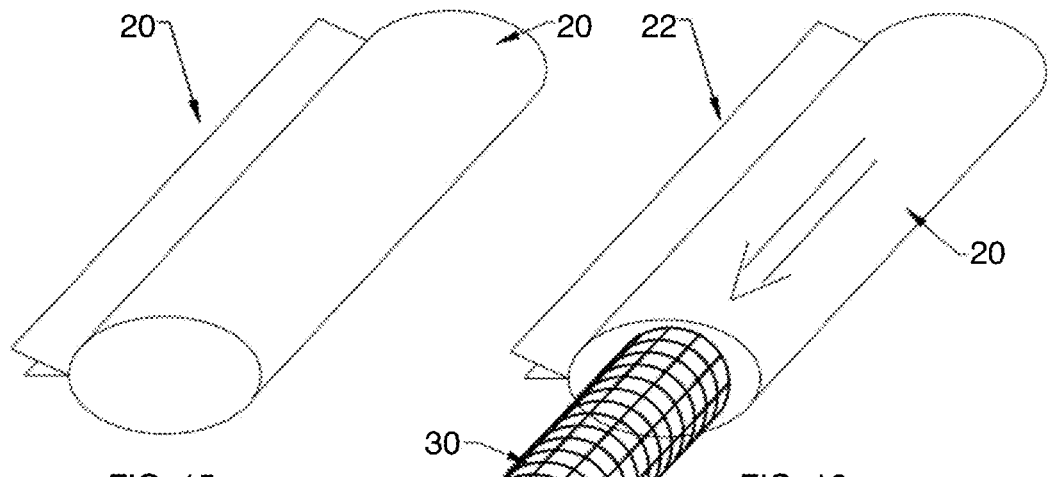
FIG. 15 is a perspective view of a sleeve prior to frame insertion.
FIGS. 16-18 are perspective views showing the insertion of a frame into the sleeve of FIG. 15 to keeping the sleeve in tension.

FIG. 8 is a perspective view of the internal frame 30 in the flat configuration, prior to curving and placing into the sleeve 20. Frame 30 has a first edge 31 and a second edge 32. FIG. 9 is a perspective view of the internal frame forming a "C" shape. FIG. 10 is a perspective view of the geotextile filter sleeve. This arched configuration is one example of a self-supported raised frame. In other examples, other cross section can be rectangular, triangular, or other polygonal shape, where those shapes omit at least part of a base so that the sides may be compressed for insertion into a sleeve. As discussed below, in other embodiments, the frame may include all or part of a base, and a sleeve is formed over the frame.

FIG. 11-14 are perspective views showing how the internal flexible permeable frame 30 is temporarily curved by bending edges 31 and 32 so as to fit into the geotextile filter sleeve.

Figure 17:
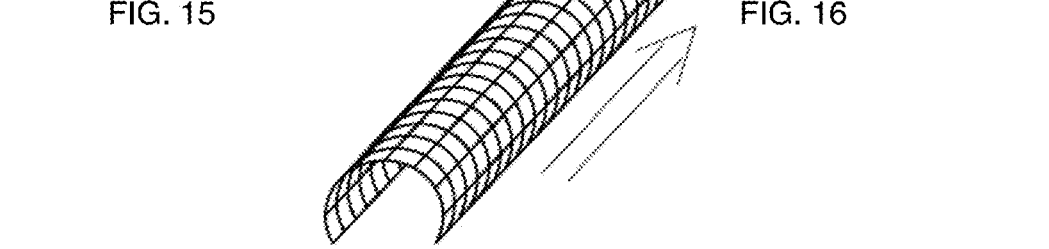

FIGS. 15-18 show the insertion of the frame 30 into the sleeve 20. In FIG. 17, the overly bent frame is slid into the sleeve and allowed to expand (FIG. 18) to fit the form of the geotextile, thereby keeping the geotextile in tension.

Figure 18:
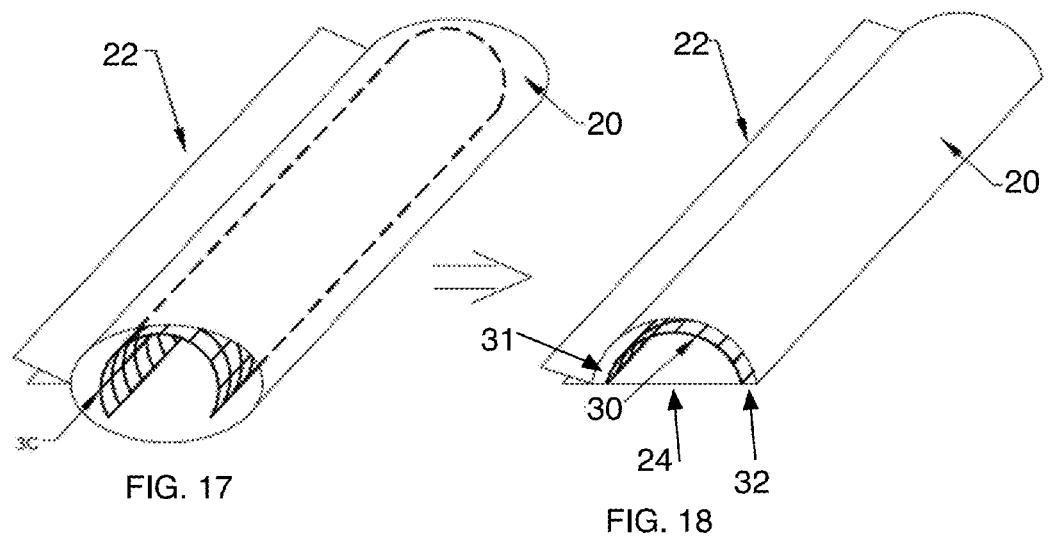

FIG. 18 is a perspective view of the double filtration sediment control filter with the inner frame expanded into the geotextile filter sleeve. After insertion, the edges 31 and 32 expand outwardly to form a flat base 24 of the sleeve 20. This flat base is positioned on the ground to provide a stable base for the filter device.

Placement and Use

In one embodiment, the sediment control filter is placed around the perimeter of a construction site or along the downhill portions of the site to intercept storm water runoff and filter the sediment that otherwise would be carried off-site and contribute to pollution of waterways and receiving bodies of water. The device can also be used to filter stormwater on slopes or channels where it is placed to intercept stormwater. The device comprises an arch such as inverted U-shaped or partially inverted C-shaped flexible longitudinal permeable frame that is encased in a filtering geotextile. The geotextile is capable of allowing stormwater to pass through the device so as not to alter intended drainage patterns, while filtering out water-borne sediment. In one example, the filtering geotextile is sewn, adhered, stapled, or otherwise attached to itself to form a tube or sleeve and a seam.

Most stormwater filtering devices fail due to either stormwater going under or around the device or fail under the weight of water ponded behind the devices because they are clogged with sediment; or use a single filter membrane that can't provide the dual function of water flow and water filtration In this embodiment, the device has a relatively broad bottom to provide good connection to the ground. The use of a leading flap, or of both a leading and trailing flap, helps to guide the stormwater to flow through the device. In this specification, the term "flap" refers to either a single layer of material, or two layers of material. In one example, both layers of a two layer flap are oriented horizontally and are secured with a staple. In other examples, an upper layer is oriented horizontally and are secured with a staple, while the lower layer is oriented vertically and buried.

Figure 19:
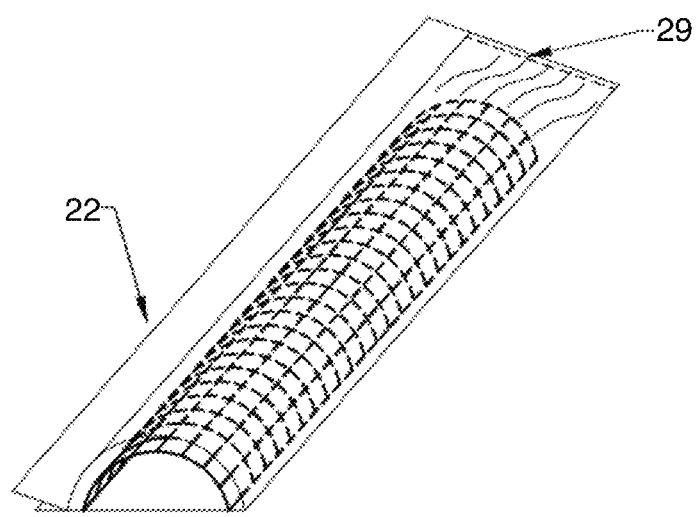
FIG. 19 is a perspective view of a sediment control filter with an expanded inner frame and a closed sleeve end.

FIG. 19 is a perspective view showing a closure 29 of the geotextile filter sleeve that is used at each end of a series of sediment control filters. The closure is typically provided as a sewn end piece, but other closure techniques may be used, including folding and staking the end portion; hook and loop fasteners, adhesive, etc.

Figure 20:
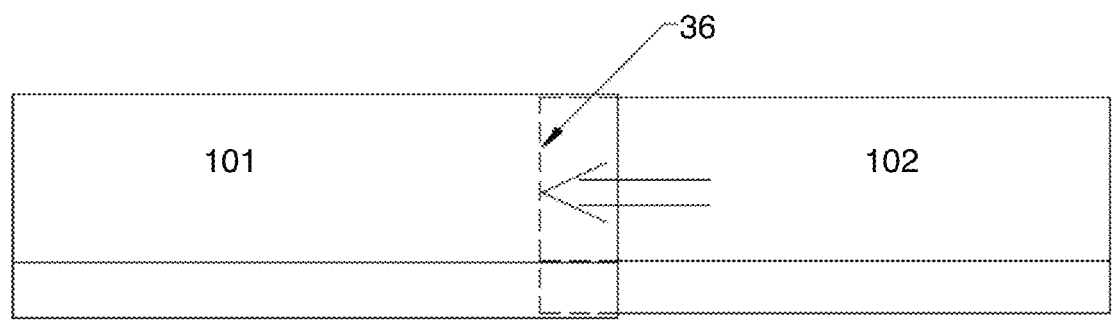
FIG. 20 is a top view of two sediment control filter segments coupled together.

A plurality of filter module segments are typically assembled in the field. One technique for joining modules is illustrated by FIG. 20 which is a top view of two sediment control filters 101 and 102 coupled together by temporarily collapsing one end 36 of one sediment control filter frame and forcing it into the receiving end of the second sediment control filter frame. Sleeves are typically provided in lengths longer than the frames so that the end of one sleeve may be tucked inside an overlapping sleeve. A slit is made in the geotextile flap of the receiving sediment control filter to allow the flaps to bypass one another.

Figure 25:
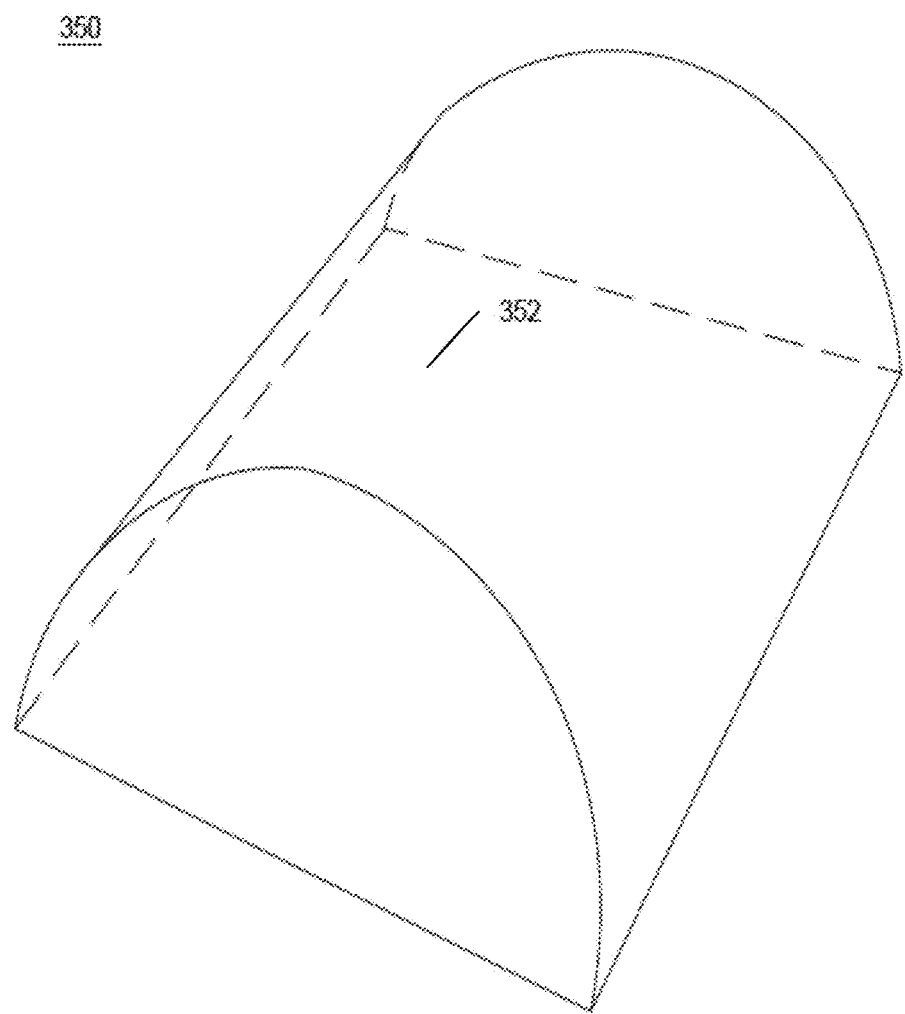
FIG. 25 is a perspective view of a filter segment connection element.

Another assembly technique is illustrated in FIG. 25, which is a side perspective view of a foam connector 350. In this example, the pre-formed connector has an arched upper portion 352 and a flat bottom surface. In this example, one end of the connector is inserted into a the frame of a first module, and the other end of the connector is inserted into the frame of a second module.

FIG. 21 is a side view of the curved frame showing removal of a central wedge 37 of frame 30 to allow the frame to articulate on pivot point 38 to accommodate variable sloped terrain. The wedge is typically removed with a knife or wire cutters.

The installed device can be driven-over with construction vehicles and it, due to the elastic nature of the inner flexible frame, will rebound to the original shape. This feature, coupled with the natural low profile of the device, enables the device to remain in place during construction activities thus improving site accessibility. In the event that the device needs to be removed and reinstalled, this can be accomplished relatively easily by pulling the sod staples and disengaging the geotextile flap.

Kit

The use of geotextiles designed specifically for high flow-through capacity in a double filtering configuration coupled with the flow directing flaps, the device will provide a dependable filtration function. In one example, the device is shipped as three separate components— the outer geotextile sleeve(s), the inner flexible permeable frame(s), shipped in a flat configuration, and wire sod staples. In the case of a flexible frame, a plurality of flat frames may be stacked for flat shipment, and then bent on-site for installation.

In another example, the filter fabric is formed into a sleeve over the frame. This field installation technique supports automated installation of a continuous filter barrier where long rolls of fabric material are unrolled together with long rolls of a flexible frame. As portions of the frame roll is bent, portions of the sleeve are sewn or otherwise attached to contain the bent portion of the frame.

Dual Filter Configuration and Other Features

FIG. 22 is a cross-section of the double filtration sediment control filter with a dual geotextile filter configuration. The front geotextile 210 is a higher permeability geotextile than the back filtering geotextile 220. The portions are joined along seam 222. Flaps are created at seam 211. The front geotextile 210 provides upper flap 211, and the back filtering geotextile 220 forms the bottom 224 and lower flap 223. The use of two fabrics permits the device to be design for optimum filtration.

FIG. 23 is a cross-section of the sediment control filter with an additional sediment capture tube 70 or roll inserted into the central core air space to maximize filtration and removal of contaminants from stormwater.

FIG. 24 shows high flow relief cuts 240 in sleeve 20. In the event that the inside filter surface backs up flow, the relief cuts permit a portion of the flow, that has been filtered by the first filter surface, to bypass the second filter. The relief cuts also permit overflowing stormwater to be directed into the sleeve.

Figure 26:
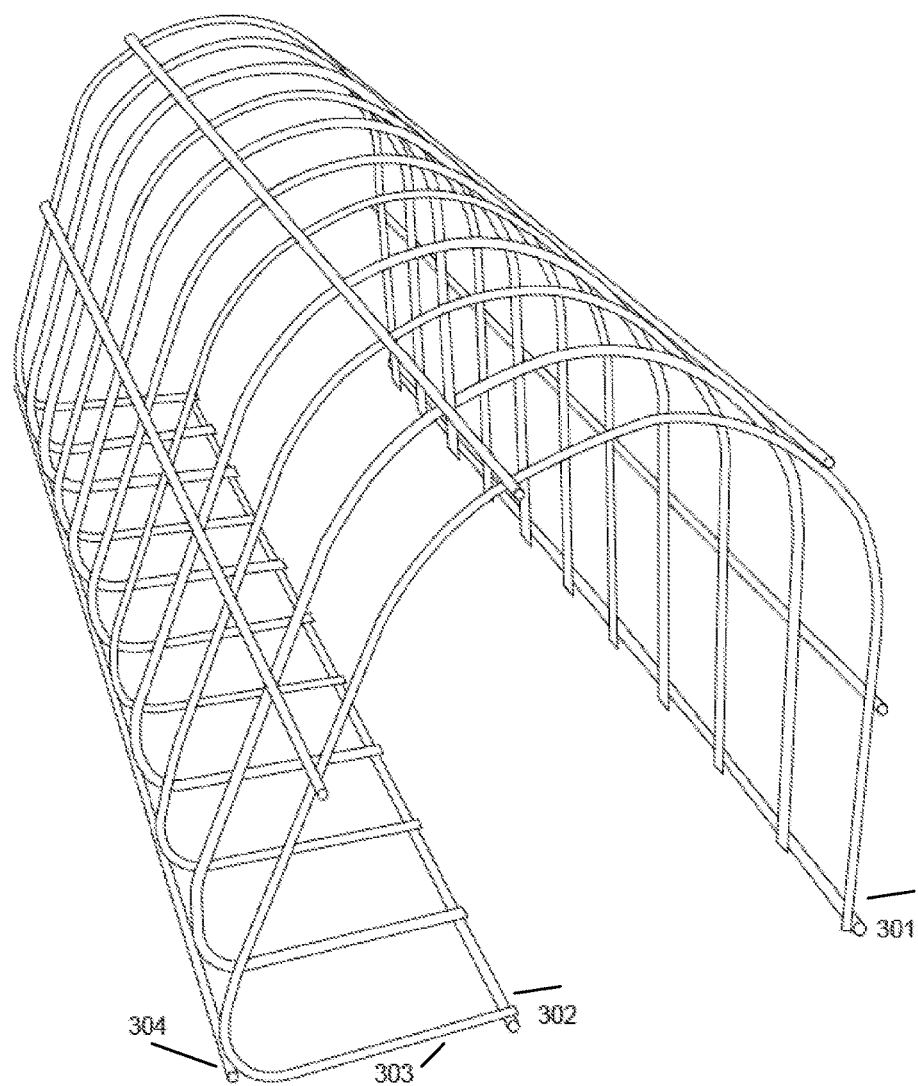
FIG. 26 is a perspective view of a metal filter segment frame.

FIG. 26 is an example of a pre-formed metal frame 300. In this example, the frame 300 has a first end 301, and a lower corner 304 which is formed by bending the second end 302 into a flat base portion 303. A relatively stiff wire mesh is used for the frame so that the frame has sufficient flexibility to be compressed slightly for insertion into a sleeve. In other examples, the metal frame may be of a simple arched shape without the flat base portion so that frames may be stacked for shipment.

In other examples, two pieces of geotextile are sewn together to form a leading flap, a sleeve, and a trailing flap. The upper portion is typically longer than the lower portion in order to provide an arched upper portion of the sleeve, while the lower portion is shorter to provide a flat base. The trailing flap may be covered with a thin veneer of soil or are placed into an anchor trench on the trailing edge of the device.

In one example, the frame has a width of about 20 inches so that a low profile device permits easier site access and improved aesthetics on home building sites.

After service, the frame portion may be removed, stored in a convenient flat or stacked orientation and re-deployed with a fresh or cleaned sleeve.

In another embodiment of a self-supporting frame, a length of filter fabric is laid out on ground where the front edge is placed in a trench. A low profile metal frame is placed over the fabric a few inches away from the leading edge. The rear portion of the fabric is folded over the frame so as to form a leading edge flap. the flap is then secured to the ground with stakes or staples close to the leading edge of the frame. This technique provides an unattached sleeve with the double filtration capabilities described above.

While exemplary embodiments of the invention have been described, it should be apparent that modifications and variations thereto are possible, all of which fall within the true spirit and scope of the invention. With respect to the above descriptions then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A sediment control filter comprising
a first filter segment having a first end and a second end, the first filter segment comprising
an elongated geotextile panel folded lengthwise, the folded elongated panel comprising
an upper layer,
a lower layer,
an attachment seam, the attachment seam connecting the upper layer and the lower layer, the attachment seam forming an elongated first flap portion, and
an elongated sleeve, the sleeve comprising
a base having a leading base edge and a trailing base edge, and
a raised portion extending upwardly from the leading base edge and the trailing base edge;
a self-supporting elongated frame, formed by bending a flat polymer or wire frame, the elongated frame having a substantially-open cross section and a raised portion, the elongated frame comprising
a leading longitudinal edge, and
a trailing longitudinal edge spaced apart from the leading edge,
the elongated frame positioned within the elongated sleeve; and
a plurality of hold-down elements securing the elongated upper layer flap portion to a ground surface.

2. The sediment control filter of claim 1 wherein the elongated sleeve has an external leading filtering surface and an internal trailing filtering surface.

3. The sediment control filter of claim 1 wherein a second segment having a first end and a second end, the second filter segment comprising
an elongated geotextile panel folded lengthwise, the folded elongated panel comprising
an upper layer,
a lower layer,
an attachment seam, the attachment seam connecting the upper layer and the lower layer, the attachment seam forming an elongated first flap portion, and
an elongated sleeve, the sleeve comprising
a base having a leading base edge and a trailing base edge, and
a raised portion extending upwardly from the leading base edge and the trailing base edge;
a self-supporting elongated frame, formed by bending a flat polymer or wire frame, the elongated frame having a substantially-open cross section and a raised portion, the arched elongated frame comprising
a leading longitudinal edge, and
a trailing longitudinal edge spaced apart from the leading edge,
the elongated frame positioned within the elongated sleeve; and
a plurality of hold-down elements securing the elongated upper layer flap portion to a ground surface, such that the first end of the second segment is connected to the second end of the first segment.

4. The sediment control filter of claim 3 further comprising
a connecting element having a first end portion and a second end portion, such that the first end portion of the connector is inserted into the second segment frame and the second end portion of the connector is inserted into the first segment frame.

5. The sediment control filter of claim 4 further comprising
a foam connecting element having a flat base and a raised upper surface.

6. The sediment control filter of claim 1 wherein the elongated frame is formed by bending a flat polymer frame.

7. The sediment control filter of claim 6 wherein the flat polymer frame is a polypropylene geogrid.

8. The sediment control filter of claim 1 wherein the elongated frame is a pre-formed wire frame.

9. The sediment control filter of claim 1 further comprising
a sediment capture tube positioned within the sleeve and inside the frame.

10. The sediment control filter of claim 1 further comprising
a flocculant agent positioned within the sleeve and inside the frame.

11. The sediment control filter of claim 1 further comprising
a plurality of high flow relief cuts provided in the geotextile sleeve.

12. The sediment control filter of claim 1 wherein the plurality of hold-down elements are sod staples.

13. The sediment control filter of claim 1 wherein the self-supporting elongated frame is arched.

14. A sediment control dual filter method comprising
providing a first elongated geotextile panel comprising a sleeve and a flap extending from the sleeve;
providing a first self-supporting elongated frame with long frame edges;
assembling a first filter module by
over-bending the frame,
inserting the over-bent frame into the sleeve,
releasing the over-bent frame and permitting a spring action in the over-bent frame to force the long frame edges apart, thereby internally tensioning the sleeve over the frame in order to provide a leading filter surface on the outside of the sleeve in proximity to the flap, and a trailing filter surface on the inside of the sleeve opposite the flap;
attaching the first filter module to a ground surface, such that the flap is positioned level or uphill from the sleeve.

15. The sediment control filter method of claim 14 further comprising
providing the elongated geotextile panel in a single material.

16. The sediment control filter method of claim 14 further comprising
providing the elongated geotextile panel in two portions such that the first portion is used as the leading filter surface and the second portion is used as the trailing filter surface.

17. The sediment control filter method of claim 14 further comprising
providing additional elongated geotextile panels, each panel comprising a sleeve and a flap extending from the sleeve;
providing additional arched elongated frames;
assembling a plurality of filter modules from the panels and frames; and
and connecting the plurality of filter modules end to end.

18. The sediment control filter method of claim 14 further comprising
attaching the first filter module to a ground surface with a plurality of sod staples by inserting the plurality of sod staples through the flap.

19. The sediment control filter method of claim 14 further comprising
inserting a flocculant agent or a sediment capture tube within the sleeve.

20. A sediment control filter kit comprising
a plurality of filter segment components comprising
a plurality of elongated geotextile panels, each panel folded lengthwise and comprising
an upper layer,
a lower layer,
an attachment seam, the attachment seam connecting the upper layer and the lower layer, the attachment seam forming an elongated first flap portion, and
an elongated sleeve, the sleeve comprising
a base having a first base end and a second base end, and
a raised portion extending upwardly from the first base end and the second base end;
a plurality of self-supporting elongated frames, formed by bending a flat polymer or wire frames, each elongated frame having a substantially-open cross section and a raised portion and comprising
a leading longitudinal edge, and
a trailing longitudinal edge spaced apart from the leading edge: and
a plurality of hold-down elements.

* * * * *